US010906010B2

(12) United States Patent
Fanchini et al.

(10) Patent No.: US 10,906,010 B2
(45) Date of Patent: Feb. 2, 2021

(54) METHOD OF PRODUCTION OF NANOPOROUS MEMBRANES FOR WATER PURIFICATION FROM METAL IONS AT LOW DIFFERENTIAL PRESSURES

(71) Applicant: The University of Western Ontario, London (CA)

(72) Inventors: Giovanni Fanchini, London (CA); Jaewoo Park, London (CA)

(73) Assignee: THE UNIVERSITY OF WESTERN ONTARIO, London (CA)

(*) Notice: Subject to any disclaimer, the term of this patent is extended or adjusted under 35 U.S.C. 154(b) by 492 days.

(21) Appl. No.: 15/945,124

(22) Filed: Apr. 4, 2018

(65) Prior Publication Data
US 2018/0290108 A1 Oct. 11, 2018

Related U.S. Application Data

(60) Provisional application No. 62/482,399, filed on Apr. 6, 2017.

(51) Int. Cl.
| | |
|---|---|
| *B01D 71/02* | (2006.01) |
| *B01D 67/00* | (2006.01) |
| *C02F 1/28* | (2006.01) |
| *B01J 20/20* | (2006.01) |
| *B01J 20/10* | (2006.01) |
| *B01J 20/32* | (2006.01) |
| *B01J 20/30* | (2006.01) |
| *C02F 1/44* | (2006.01) |
| *B01D 71/54* | (2006.01) |
| *B01D 69/12* | (2006.01) |
| *B01D 71/46* | (2006.01) |
| *B01D 71/30* | (2006.01) |
| *B01D 71/36* | (2006.01) |
| *B01D 71/42* | (2006.01) |
| *B01D 71/32* | (2006.01) |
| *B01D 69/14* | (2006.01) |
| *B01D 71/38* | (2006.01) |
| *C02F 101/20* | (2006.01) |

(52) U.S. Cl.
CPC ......... *B01D 71/028* (2013.01); *B01D 67/006* (2013.01); *B01D 67/009* (2013.01); *B01D 67/0041* (2013.01); *B01D 67/0048* (2013.01); *B01D 67/0058* (2013.01); *B01D 67/0062* (2013.01); *B01D 67/0069* (2013.01); *B01D 67/0079* (2013.01); *B01D 67/0088* (2013.01); *B01D 69/12* (2013.01); *B01D 69/141* (2013.01); *B01D 71/02* (2013.01); *B01D 71/021* (2013.01); *B01D 71/027* (2013.01); *B01D 71/30* (2013.01); *B01D 71/32* (2013.01); *B01D 71/36* (2013.01); *B01D 71/38* (2013.01); *B01D 71/42* (2013.01); *B01D 71/46* (2013.01); *B01D 71/54* (2013.01); *B01J 20/10* (2013.01); *B01J 20/20* (2013.01); *B01J 20/3007* (2013.01); *B01J 20/3295* (2013.01); *C02F 1/281* (2013.01); *C02F 1/288* (2013.01); *C02F 1/44* (2013.01); *C02F 1/442* (2013.01); *B01D 2313/24* (2013.01); *C02F 1/283* (2013.01); *C02F 2101/203* (2013.01); *C02F 2101/206* (2013.01)

(58) Field of Classification Search
CPC .. B01D 71/02; B01D 71/028; B01D 67/0058; B01D 67/0069; B01D 71/021; B01J 20/10; B01J 20/20; B01J 20/3007; B01J 20/3295; C02F 1/281; C02F 1/44; C02F 2101/203; C02F 2101/2101; C02F 2101/206
USPC .......................................................... 502/5
See application file for complete search history.

(56) References Cited

U.S. PATENT DOCUMENTS

| | | |
|---|---|---|
| 2014/0263035 A1 | 9/2014 | Stoltenberg et al. |
| 2015/0151254 A1 | 6/2015 | Perez |
| 2015/0217219 A1 | 8/2015 | Sinsabaugh et al. |
| 2015/0258502 A1 | 9/2015 | Turowski |

FOREIGN PATENT DOCUMENTS

| | | |
|---|---|---|
| WO | 2013138698 A1 | 9/2013 |
| WO | 2015066404 A1 | 5/2015 |

OTHER PUBLICATIONS

H. M. Hegab and L. Zou, "Graphene oxide-assisted membranes: Fabrication and potential applications in desalination and water purification", J. Membr. Sci., 2015, 484, pp. 95-106.
R. K. Joshi, P. Carbone, F. C. Wang, V. G. Kravets, Y. Su, I. V. Grigorieva, H. A. Wu, A. K. Geim and R. R. Nair, "Precise and Ultrafast Molecular Sieving Through Graphene Oxide Membranes", Science, 2014, 343, pp. 752-754.

(Continued)

Primary Examiner — Edward M Johnson
(74) Attorney, Agent, or Firm — Hill & Schumacher

(57) ABSTRACT

The present disclosure provides a method for producing a water permeable molecular sieve in which a porous substrate having micron-size pores has deposited on a surface thereof non-porous 2D platelets to seal, at the substrate surface, pores in the porous substrate to form a layer of 2D platelets. A curable sealing material is deposited onto the layer of 2D platelets and any remaining exposed areas of the surface of the porous substrate and curing the curable sealing material in order to form a sealed layer on the surface of the porous substrate to prevent water by-passing the non-porous 2D platelets and passing through the porous substrate. An array of sub-nanopores are then produced through the sealed layer with the array of sub-nanopores having a size to allow water to pass therethrough but not metal ions to give a water permeable molecular sieve characterized by water permeability at low differential pressures.

20 Claims, 10 Drawing Sheets

(56) References Cited

OTHER PUBLICATIONS

A. Aghigh, V. Alizadeh, H. Y. Wong, M. S. Islam, N. Amin and M. Zaman, "Recent advances in utilization of graphene or filtration and desalination of water: A review", Desalination, 2015, 365, pp. 389-397.

S. P. Surwade, S. N. Smirnov, I. V. Vlassiouk, R. R. Unocic, G. M. Veith, S. Dai and S. M. Mahurin, "Water desalination using nanoporous single-layer graphene", Nat. Nanotechnol., 2015, 10, pp. 459-464.

K. He, A. W. Robertson, C. Gong, C. S. Allen, Q. Xu, H. Zandbergen, J. C. Grossman, A. I. Kirklanda and J. H. Warner, "Controlled formation of closed-edge nanopores in ngraphene", Nanoscale, 2015, 7, pp. 11602-11610.

D. Zhou, Y. Cui, P.-W. Xiao, M.-Y. Jiang and B.-H. Han, "A general and scalable synthesis approach to porous graphene", Nat. Commun., 2014, 2, pp. 1-7.

H. Cao, X. Zhou, C. Zheng and Z. Liu, "Metal etching method for preparing porous graphene as high performance anode material for lithium-ion batteries", Carbon, 2015, 89, pp. 41-46.

Q. M. Ramasse, R. Zan, U. Bangert, D. W. Boukhvalov, Y.-W. Son and K. S. Novoselov, "Direct Experimental Evidence of Metal-Mediated Etching of Suspended Graphene", ACS Nano, 2012, 6, pp. 4063-4071.

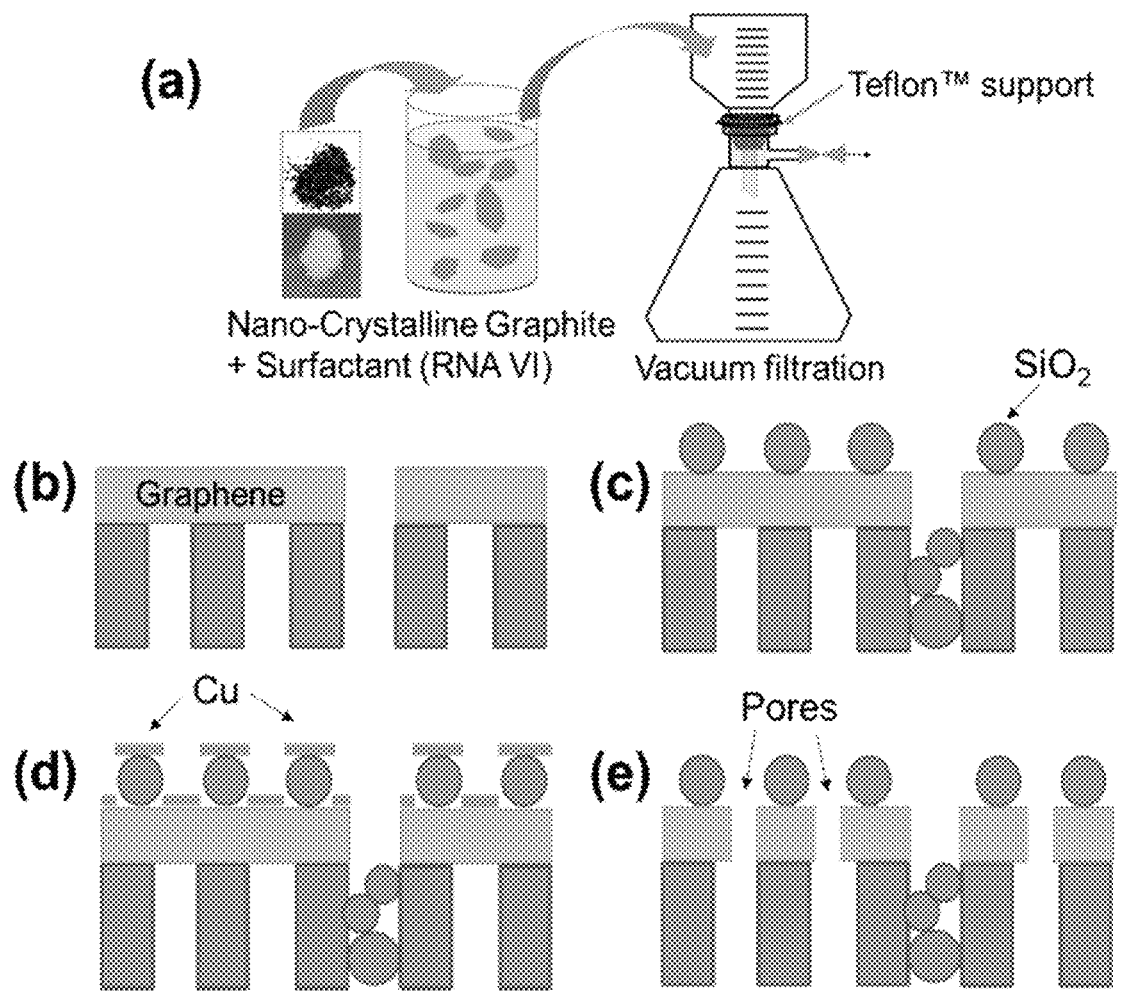
Figure 1(a), (b), (c), (d), (e)

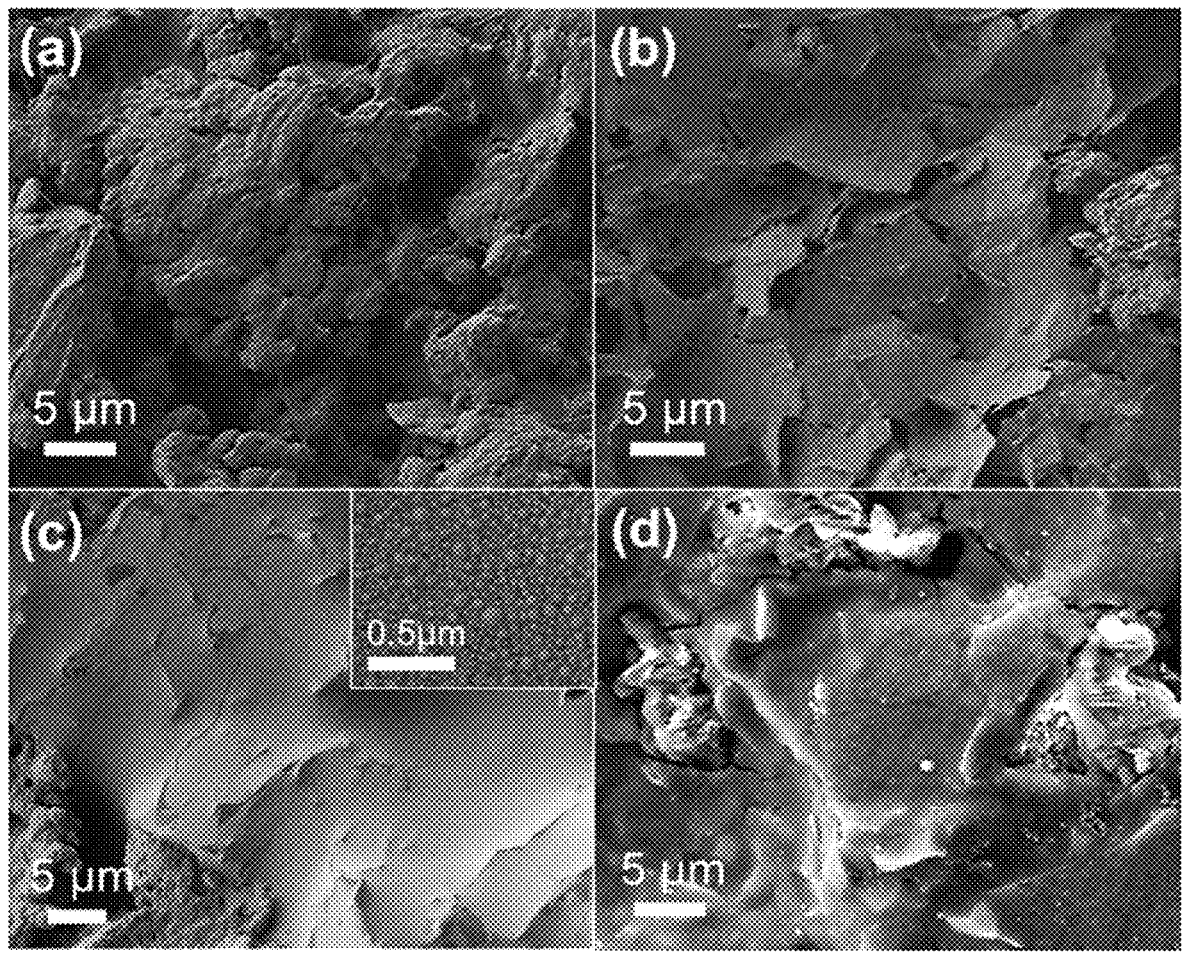
Figure 2 (a), (b), (c), (d)

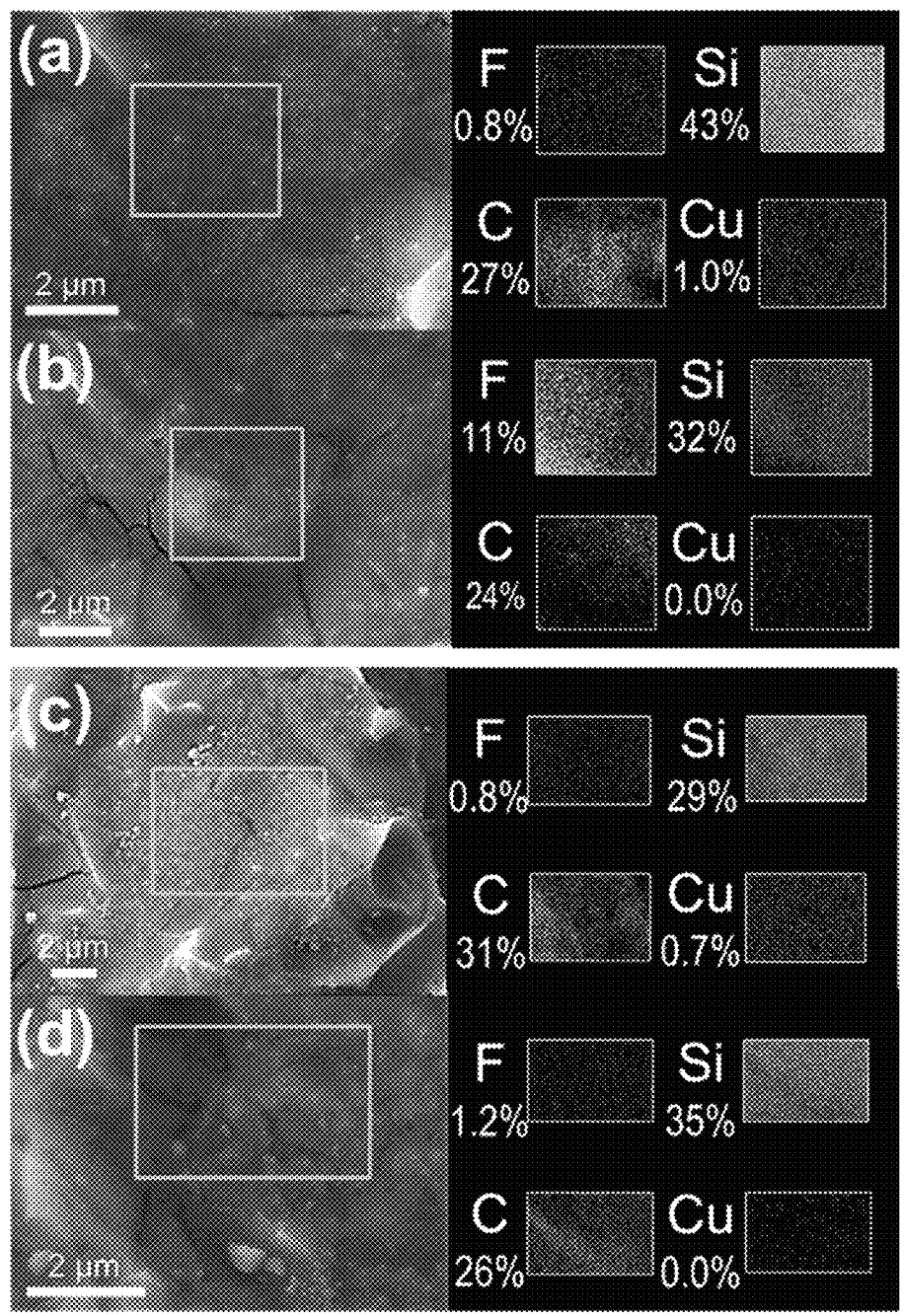
Figure 3(a), (b), (c), (d)

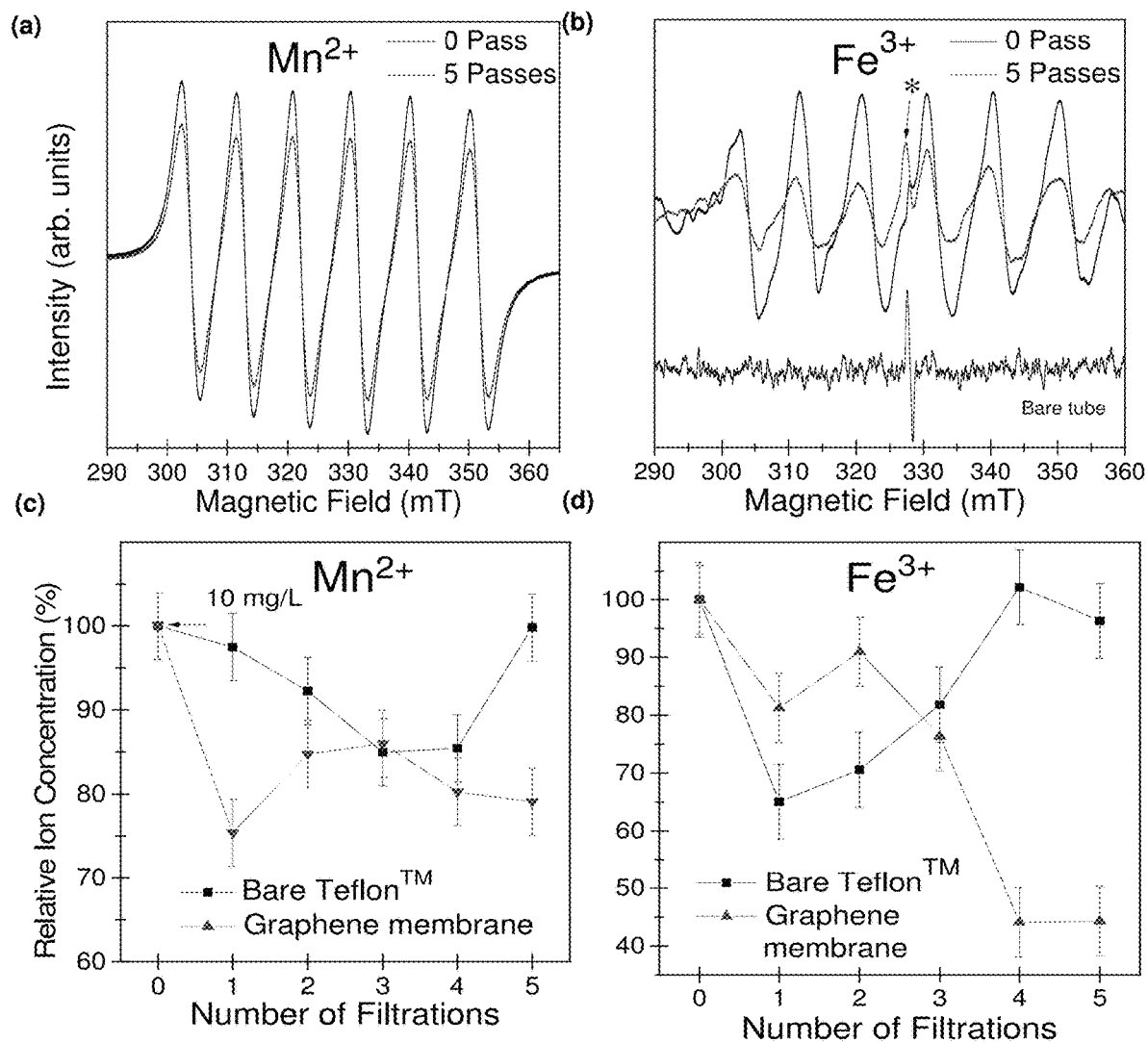
Figure 5(a), (b), (c), (d)

METHOD OF PRODUCTION OF NANOPOROUS MEMBRANES FOR WATER PURIFICATION FROM METAL IONS AT LOW DIFFERENTIAL PRESSURES

FIELD

The present disclosure relates to water permeable molecular sieves and methods of production for use in purifying water contaminated with metal ions, and more particularly this disclosure provides method of producing water permeable molecular sieves characterized by water permeability at low differential of less than 100 kPa.

BACKGROUND

In recent years, the global demand for clean water has been continuing to increase due to rapid growth of the world's population and industry. Reverse osmosis (RO) has become a vital research area in water purification, with the potential to decisively decrease the energy footprints associated with other purification methods, including chemical precipitation, flocculation, ion exchange, and electro-membrane systems (see references 1, 2) The energetic cost of purifying water by RO is determined by the differential pressure (typically ~100 kPa) (see reference 3) required at the two faces of a porous membrane traversed by water. Membranes operating at lower differential pressures are in tremendous demand to limit the energetic cost of RO. Since water flux across a membrane scales inversely with the membrane thickness, thinner membranes are vital to decrease the operating pressure of RO processes at a given water flow, and graphene-based materials have been identified as the ideal alternatives to existing RO membrane materials due to their thinness (see references 4, 5).

Among graphene-based materials, graphene oxide (GO) has been widely explored for RO filtration. In principle, GO is capable of filtrating both metal and organic contaminants by size-based rejection (see references 6, 7). However, graphene oxide-based filtration relies on water passing through the interlayer spacing between GO layers which poses very stringent limitations on GO filtration devices: (i) typically, filtration occurs through the spacing between two oxidized graphene layers, which is tuneable only over a very limited range; (ii) there are little benefits in terms of increased flow rate due to graphene thinness, because flakes are not used along their thinnest dimension, but as sorbents along their lateral dimensions; and (iii) GO domains ideally need to be placed vertically to minimize pathway through the pores and ensure a good flow rate at acceptable differential pressures, which may lead to water leaks between neighboring domains and thus limit the effectiveness of filtration (see references 7, 8, 9). To summarize, purification utilizing GO interlayers has inherent limitations, in spite of incremental research focused on improving the flow rate and decreasing the filtration pressure.

Non-oxidized, single-layers of graphene have also been proposed as potential alternatives to GO (see references 10, 11). Water filters can be made by perforating single-layer graphene with sub-nanometre pores to produce atomically thin sieves. However, preparing continuous single-layers of non-oxidized and porous graphene is high in cost and complexity, and offers limited promise in terms of scalability. It requires large-area single-layer graphene, normally prepared by energy-expensive chemical vapor deposition, combined with advanced procedures to create pores, such as ion or electron beam irradiation in ultrahigh vacuum (see references 12, 13). In order to solve these issues, chemical etching of non-oxidized graphene has been explored (see references 14, 15), but pores fabricated so far by these methods suffer from significant limitations, including prohibitively long etching times (1 week or more) or pores too large (>200 nm) to be used for water filtration of metal ion contaminants. A significant breakthrough in terms of design of water purification devices and efficient pore fabrication in graphene-based membranes is needed to exploit their unique thinness for water purification.

It would be very advantageous to provide water permeable molecular sieve characterized by water permeability at low differential pressures such that water is able to pass through the sieve with differential pressures applied across the two sides of significantly less than 100 kPa.

SUMMARY

The present disclosure provides a method producing a water permeable molecular sieve, comprising:

a) providing a porous substrate having micron-size pores;

b) depositing non-porous 2D platelets onto a surface of the porous substrate to seal, at the surface, pores in the porous substrate to form a layer of 2D platelets;

c) depositing a curable sealing material onto the layer of 2D platelets and any remaining exposed areas of the surface of the porous substrate and curing the curable sealing material in order to form a sealed layer on the surface of the porous substrate to prevent water by-passing the non-porous 2D platelets and passing through the porous substrate; and d) producing an array of sub-nanopores through the sealed layer with the array of sub-nanopores having a size to allow water to pass therethrough but not metal ions to give a water permeable molecular sieve characterized by water permeability at low differential pressures.

In some embodiments the porous substrate having micron-size pores may comprise any one of microporous Teflon™, polytetrafluoroethylene, polycarbonate, nitrocellulose, anodized alumina, fritted glass, plastic grids and metallic grids.

In some embodiments the non-porous 2D platelets may comprise any one of graphene platelets, graphene oxide platelets, doped graphene platelets, functionalized graphene platelets, boron nitride platelets, $MoS_2$ platelets, $MoSe_2$ platelets, carbon platelets, carbon fibres, micro graphite platelets, nanocrystalline graphite platelets, nickel oxide platelets, nickel oxide tubules, silicon whiskers, and silicon platelets.

In some embodiments the curable sealing material may comprise any one or combination of sol-gel processed materials, epoxy resins, vinyl glues (vinyl polymers), polyurethane, curable polymers and ceramics.

In some embodiments the sol-gel processed materials may comprise any one or combination of alkoxides, silicates, acrylates, siloxanes, ormosils, silica gels, and sulfides.

In some embodiments the epoxy resins comprise any compounds that can be produced by combining phenols, bisphenols or glycidylamines with crosslinking agents including, but not limited to epichlorohydrin, aminoplasts, phenoplasts and isocyanates.

In some embodiments the vinyl glues (vinyl polymers) may comprise any one or combination of polyvinyl alcohols, polyvinyl acetates, polyvinyl chlorides, polyacrylonitriles and polyvinyl fluorides.

In some embodiments the curable polymers comprise any one or combination of polyethylene, polyesters, polypropylene, polycarbonates, poly-chitosan, polyurethanes, polyimides, and polyamides.

In some embodiments the ceramics may comprise any one or combination of alumina, beryllia, barium titanate, bismuth strontium calcium copper oxide, boron oxide, boron nitride, ceria, ferrite, lead zirconate titanate, magnesium diboride, porcelain, silica, silicon aluminium oxynitride, silicon carbide, silicon nitride, strontium titanate, strontium aluminate, titania, titanium carbide, yttria, zinc oxide and zirconium dioxide.

In some embodiments the step d) of producing an array of sub-nanopores through the sealed layer comprises any one or combination of chemical etching of selected sites on the sealed layer, laser irradiation of selected sites on the sealed layer, ion bombardment of selected sites on the sealed layer, neutron bombardment of selected sites on the sealed layer, electron bombardment of selected sites on the sealed layer, plasma etching of selected sites on the sealed layer, and UV treatments of selected sites on the sealed layer.

The method may include a step of templating the curable sealing material onto the surface of the 2D platelets and any exposed regions of the surface of the microporous substrate in order to protect regions on the sealed surface through which the array of nanopores are not to be produced.

In an embodiment this step of templating may include controlling a size and location of the cured sealing material particles on the layer of 2D platelets and any remaining exposed areas of the surface of the porous substrate.

In another embodiment this step of templating may include selecting the microporous substrate, the 2D platelet material and the curable sealant material to have a preselected combination of hydrophobicity and hyrdophillicity to control the selectivity of pore occlusion and/or the coverage of curable sealant material on the 2D platelet surfaces and the microporous substrate.

The present disclosure provides a water permeable molecular sieve, produced by a method comprising:
 a) providing a porous substrate having micron-size pores;
 b) depositing non-porous 2D platelets onto a surface of the porous substrate to seal, at the surface, pores in the porous substrate to form a layer of 2D platelets;
 c) depositing a curable sealing material onto the layer of 2D platelets and any remaining exposed areas of the surface of the porous substrate and curing the curable sealing material in order to form a sealed layer on the surface of the porous substrate to prevent water by-passing the non-porous 2D platelets and passing through the porous substrate; and
 d) producing an array of sub-nanopores through the sealed layer with the array of sub-nanopores having a size to allow water to pass therethrough but not metal ions to give a water permeable molecular sieve characterized by water permeability at low di☐erential pressures.

A further understanding of the functional and advantageous aspects of the present disclosure can be realized by reference to the following detailed description and drawings.

BRIEF DESCRIPTION OF THE DRAWINGS

Embodiments disclosed herein will be more fully understood from the following detailed description thereof taken in connection with the accompanying drawings, which form a part of this application, and in which:

FIGS. 1(a) to 1(e) shows a schematic of the present fabrication process of pore formation in which graphene/RNA solution is vacuum filtrated onto microporous Teflon™ supports, in which:

FIG. 1(a) shows the deposition of graphene flakes onto a porous substrate using vacuum filtration;

FIG. 1(b) shows the structure obtained using the fabrication process of FIG. 1(a);

FIG. 1(c) silica colloid is deposited to fill the Teflon™ pores and spaces between graphene flakes;

FIG. 1(d) shows copper deposition forms a sub monolayer of Cu on the silica/FLG surface; and FIG. 1(e) shows Cu-assisted etching creates pores in the graphene between silica islands that penetrate the full flake thickness.

FIG. 2(a) shows an SEM micrograph of a bare microporous Teflon™ substrate.

FIG. 2(b) the SEM for the same Teflon™ substrate coated with graphene flakes obtained from vacuum filtration of 24 L m$^{-2}$ FLG suspension.

FIG. 2(c) shows the SEM for the same substrate as in panels FIGS. 2(a) and 2(b) sealed with 3 L m$^{-2}$ of colloidal silica and annealed at 250° C. The inset shows a higher resolution image of thermally nucleated np-$SiO_2$.

FIG. 2(d) shows the SEM for the same substrate shown in panels a-c are coated with a nominally 1 nm thick Cu layer and ready for Cu-assisted etching. Cu deposits both on top np-$SiO_2$ and in the inter-particle spacing in direct contact with graphene flakes.

FIG. 3(a) shows SEM and EDX images before Cu-assisted $HNO_3$ etching of a complete membrane, treated with a low (1.8 L m$^{-2}$) amount of colloidal silica.

FIG. 3(b) shows the same membrane in FIG. 3(a) after Cu-assisted $HNO_3$ etching.

FIG. 3(c) shows SEM and EDX images of a complete membrane treated with a high (4.8 L m$^{-2}$) amount of colloidal silica before Cu-assisted etching.

FIG. 3(d) shows the same membrane as in FIG. 3(c) after pore etching has been performed. Right panels show the elemental composition (in atomic %) from all detected elements, except oxygen that may be in the form of both bonded and adsorbed atoms. At low colloidal silica, the increase in fluorine after etching occurs due to increased sensitivity of the EDX technique to the F-containing microporous Teflon™ substrate, due to the formation of a network of bored nanopores in the overlaying graphene flakes.

FIGS. 5(a) and 5(b) show the EPR spectra for $Mn^{2+}$ and $Fe^{3+}$ ions respectively in aqueous solution compared to a bare EPR tube and glass capillary in FIG. 5(b). The peak indicated with an asterisk (*) is from the EPR sample holder.

FIGS. 5(c) and 5(d) show the ion concentrations of $Mn^{2+}$ and $Fe^{3+}$ respectively in aqueous solution after 0 to 5 passes through the optimized graphene-based membranes, showing retention after a single pass that increases with multiple passes for $Fe^{3+}$ ions. Performance of the same porous Teflon™ substrates prior to coating with graphene-based membranes are also shown as a reference.

DETAILED DESCRIPTION

Figure 4A:
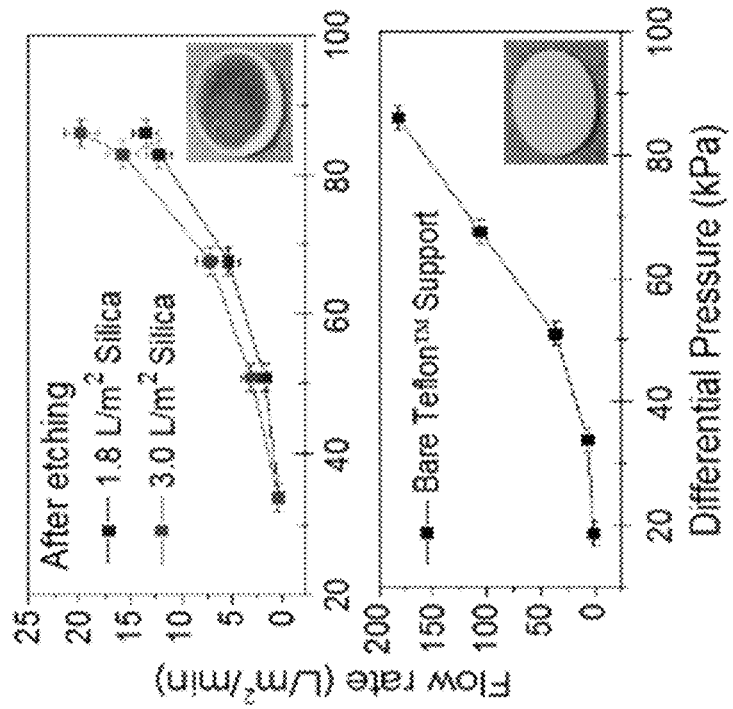
FIG. 4(a) shows flow rate vs. silica volume measured at 83 kPa di☐erential pressure. The bottom panel shows the di☐erence in flow rate after etching. The largest increase in flow rate within experimental error is observed for 3 L m$^{-2}$ of silica colloid deposited. This volume results in an ideal layer of homogenously distributed silica nanoparticles that also e☐ectively seals the inter-flake spacing. Solid lines are visual aids.

Various embodiments and aspects of the disclosure will be described with reference to details discussed below. The following description and drawings are illustrative of the disclosure and are not to be construed as limiting the disclosure. The drawings are not to scale. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions.

As used herein, the phrase "sub-nanopores" means pores having a size range between 0.01 nm and 100 nm.

As used herein, the phrase "porous substrate" refers to a porous material which can be permeated by fluids, including: liquids, gases, sols, gels, aerosols and emulsions.

As used herein the phrase "curable sealing material" refers to a sealing material that can be solidified by a treatment such as, but not limited to, crosslinking by use of chemical cross linking agents, thermal treatment, drying, photo-induced cross linking by exposure to light of suitable wavelengths, irradiation by electrons, spraying, and chemical reaction between two (or more) species or phases.

The curable sealing material may be any material forming a colloidal suspension of aggregates (with or without the assistance of a surfactant) in a liquid solvent, including but not limited to water, that can be used to fill or occlude the substrate pores.

Non-limiting examples of curable sealing materials include, but is not limited to silica particles, silica gels, polyimides, polyamides, silicates, borosilicates, epoxy resins, vinylic glues (vinyl polymers), silicones, urethanes, and polyurethanes.

As used herein the phrase "platelet materials" refers to a layer or layers of two-dimensional materials which is perforated by the methods disclosed herein and let fluids move through the sub-nanopores perforated.

As used herein, the phrase "water permeable molecular sieves characterized by water permeability at low differential pressures" means a layer of material that is impenetrable to water, except for a number of specific locations, through which water will be able to pass if differential pressures between 0 and 100 kPa are applied at the two sides of said layer.

In its broadest aspect, the present disclosure provides a method producing a water permeable molecular sieve for purifying water having metal ion contaminants contained therein. The method involves depositing, onto a surface of a porous substrate having micron-size pores, non-porous 2D platelets in order to seal, at the surface, pores in the porous substrate to form a layer of 2D platelets. Since the platelets are typically small, thin and irregularly shaped, the may coat the surface of the substrate with one layer in places or a few layers in other places with the platelets overlapping in various locations on the surface. Since the goal is to completely seal the coated surface so that later nanopores can be produced in selected locations on the sealed layer, a curable sealing material is deposited onto the layer of 2D platelets and any remaining exposed areas of the surface of the porous substrate. The curable sealing material is cured in order to form a sealed layer on the surface of the porous substrate to prevent water by-passing the non-porous 2D platelets and passing through the porous substrate.

Once the porous substrate has been sealed with the sealing layer formed by the platelets and the curable sealing material, so that water cannot pass from one side of the substrate to the other, an array of sub-nanopores is produced through the sealed layer with the array of sub-nanopores having a size to allow water to pass therethrough but not metal ions to give a water permeable molecular sieve characterized by water permeability at low differential pressures.

The porous substrate having micron-size pores may include any one of microporous Teflon™, polytetrafluoroethylene, polycarbonate, nitrocellulose, anodized alumina, fritted glass, plastic grids and metallic grids.

The non-porous 2D platelets may include any one of graphene platelets, graphene oxide platelets, doped graphene platelets, functionalized graphene platelets, boron nitride (BN) platelets, molybdenum sulphide ($MoS_2$) platelets, molybdenum selenide ($MoSe_2$) platelets, carbon (C) platelets, carbon fibres, micro graphite platelets, nanocrystalline graphite platelets, nickel oxide (NiO) platelets, nickel oxide tubules, and silicon (Si) platelets and silicon whiskers.

The curable sealing material may be any one or combination of sol-gel processed materials, epoxy resins, vinyl glues (vinyl polymers), polyurethane, curable polymers and ceramics.

The above-mentioned sol-gel processed materials may be any one or combination of alkoxides, silicates, acrylates, siloxanes, ormosils, silica gels, and sulfides.

The above-mentioned epoxy resins may be any compounds that can be produced by combining phenols, bisphenols or glycidylamines with crosslinking agents including, but not limited to epichlorohydrin, aminoplasts, phenoplasts and isocyanates.

The above-mentioned vinyl glues (vinyl polymers) may be any one or combination of polyvinyl alcohols, polyvinyl acetates, polyvinyl chlorides, polyacrylonitriles and polyvinyl fluorides.

The above-mentioned curable polymers may be any one or combination of polyethylene, polyesters, polypropylene, polycarbonates, poly-chitosan, polyurethanes, polyimides and polyamides.

The above-mentioned ceramics may comprise any one or combination of alumina, beryllia, barium titanate, bismuth strontium calcium copper oxide, boron oxide, boron nitride, ceria, ferrite, lead zirconate titanate, magnesium diboride, porcelain, silica, silicon aluminium oxynitride, silicon carbide, silicon nitride, strontium titanate, strontium aluminate, titania, titanium carbide, yttria, zinc oxide and zirconium dioxide.

The step of producing an array of sub-nanopores through the sealed layer comprises any one or combination of chemical etching (e.g. metal assisted) of selected sites on the sealed layer, laser irradiation of selected sites on the sealed layer, ion bombardment of selected sites on the sealed layer, neutron bombardment of selected sites on the sealed layer, electron bombardment of selected sites on the sealed layer, plasma etching of selected sites on the sealed layer, and UV treatments of selected sites on the sealed layer.

The example below uses metal assisted chemical etching using submonolayers of copper metal and it is discussed in detail. However, as noted immediately above, other techniques may be used.

Figure 7A:
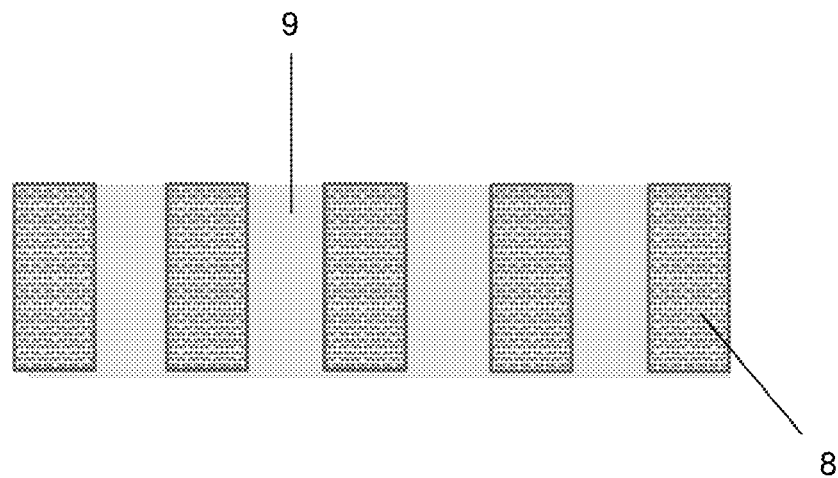
FIGS. 7(a) to 7(g) inclusively show a cross view of the different components used in the fabrication of the present molecular sieves at each step of the fabrication process.
Figure 7B:
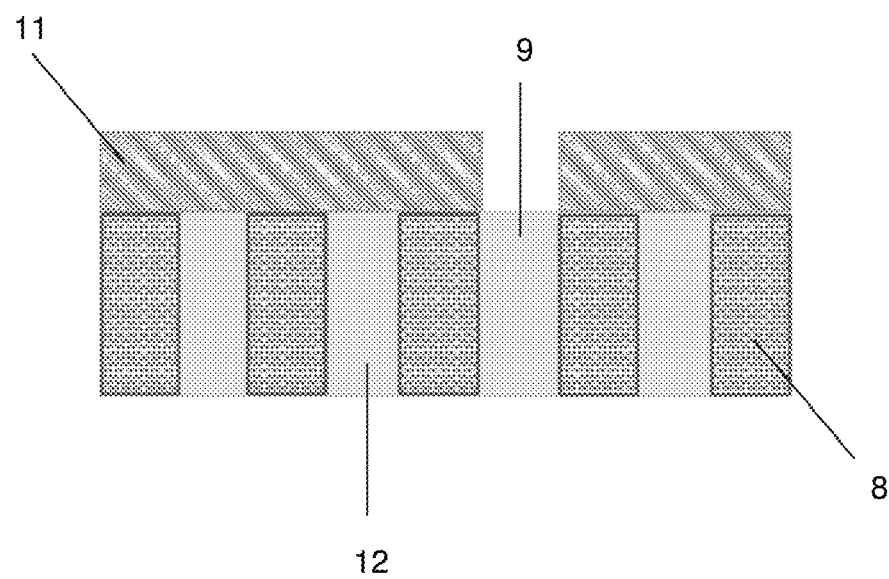
Figure 7C:
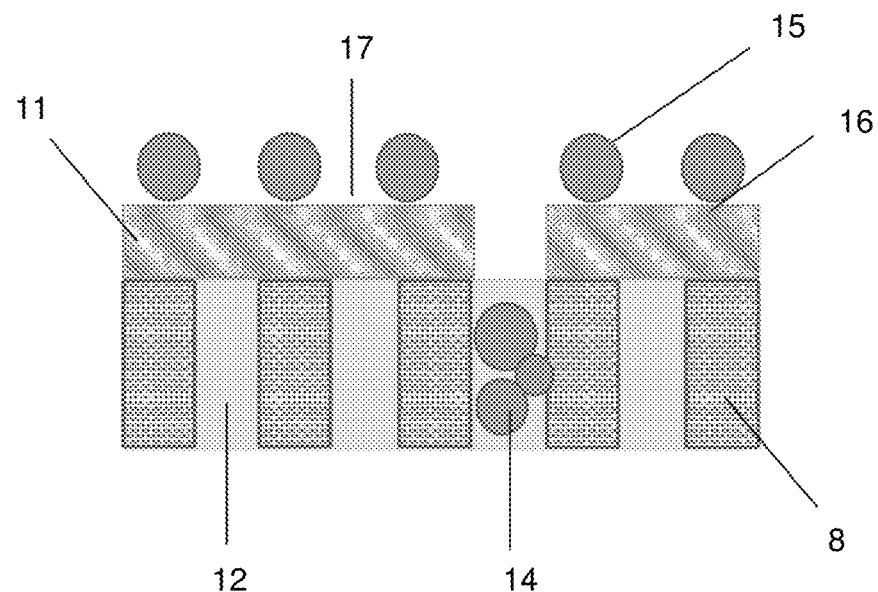
Figure 7D:
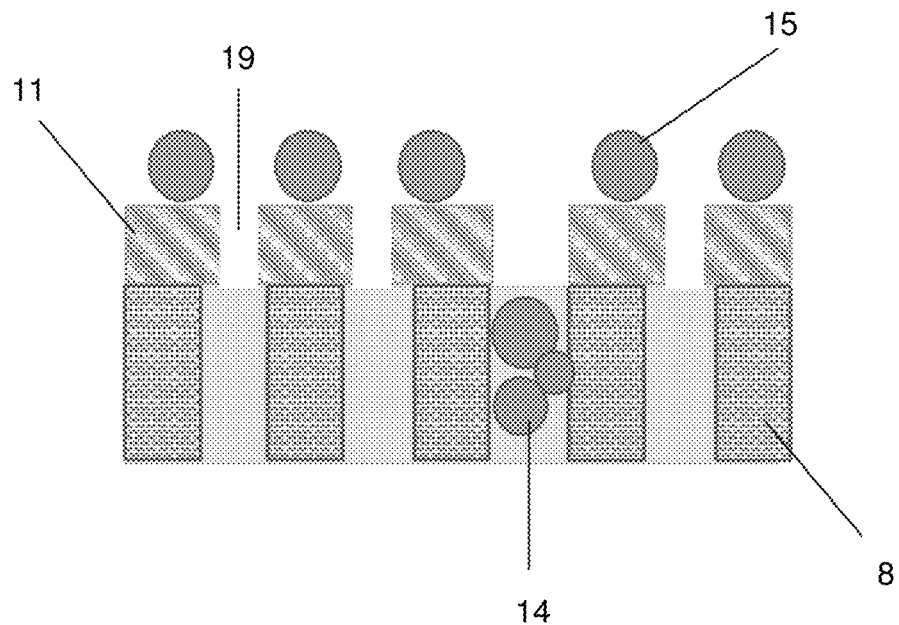

The general procedure for preparing the nanoporous membranes or sieves is shown in FIGS. 7(a) to 7(h). FIG. 7(a) illustrates a side view of a microporous substrate 8 with micropores 9 extending therethrough, while FIG. 7(b) shows a side view of the substrate 8 but with 2D platelets 11 covering or occluding pores 12 while pores 9 remain unsealed. FIG. 7(c) shows a side view of the porous substrate 8 after the curable sealing material has been deposited on top of the platelets 11 and as well the curable sealing material is deposited onto exposed areas on the surface of the porous material not covered by the platelets 11 thus sealing the uncovered pores 9. The sealant, once cured, forms particles 15 on the top surface of the platelets 11 to give covered areas 16 on the platelets 11, while any exposed pores 9 are filled by cured sealant particles 14. The cured particles 15 are useful in that they prevent the covered areas 16 from being perforated, thus particles 15 act as a template or pattering agent to direct where the nanopores are not located. Thus during the process of producing the nanopores, uncovered areas 17 on the top of the platelets 11 are the areas in which the nanopores may be produced. FIG. 7(d) shows a side view of the nanoporous sieve after production of the nanopores 19 in preselected areas through the platelets 11.

Figure 7E:
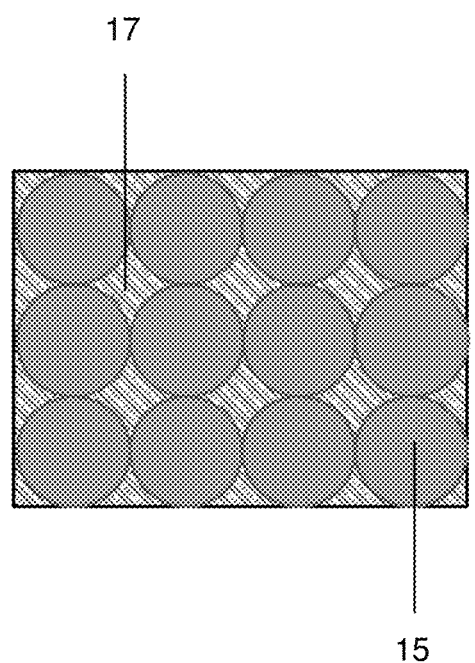

FIG. 7(e) shows a top view looking down towards the top surface of the porous membrane showing the exposed areas 17 of the top surface of platelets 11 and the cured sealant particles 15 which act to protect the areas below them from being perforated, and also act as a template so that it is only exposed areas 17 that are able to be perforated.

Figure 7F:
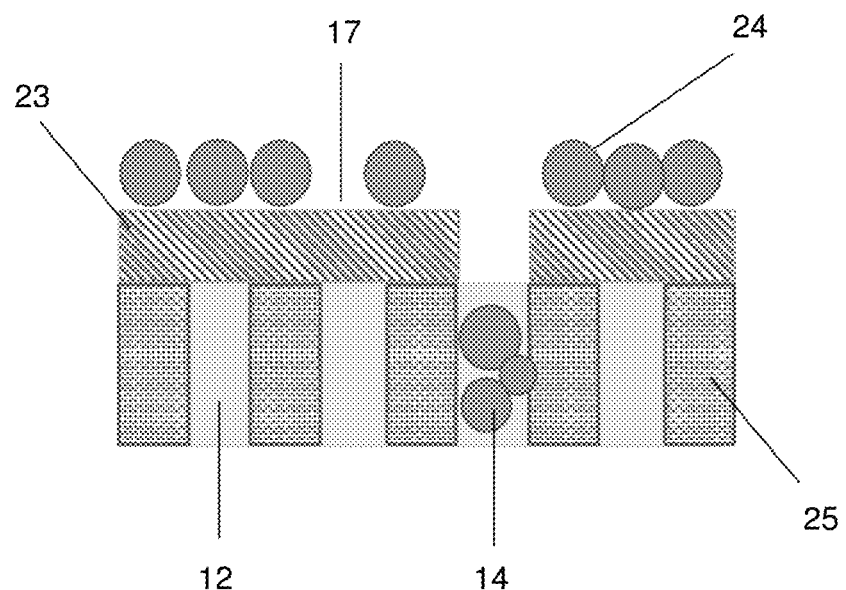
Figure 7G:
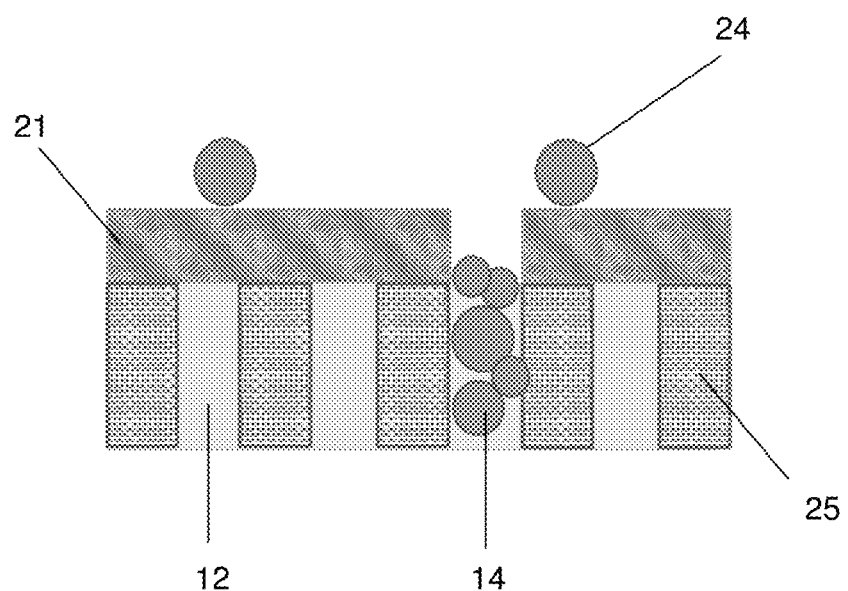

FIG. 7(f) shows a side view of one embodiment of a completed molecular sieve in which porous substrate 25 is hydrophobic, platelets 23 are hydrophilic and sealant/templating particles 24 are hydrophilic. FIG. 7(g) shows an alternative embodiment in which substrate 25 is hydrophobic, platelets 21 are hydrophobic and sealant particles 24 are hydrophilic so that fewer sealant particles 24 cover the platelets 21 compared to the embodiment in FIG. 7(h). Having different degrees of hydrophobicity/hydrophilicity of the platelets, the substrate and the sealant may be used to produce sealed surfaces with different proportions of the sealant located on the platelet and in the substrate pores which enables the pore-filling process to be selective.

In this aspect of the present method, selecting the microporous substrate, the 2D platelet material and the curable sealant material to have a preselected combination of hydrophobicity and hydrophilicity provides control over the coverage of the surface by the curable sealant material by making sure that the curable sealant material does not completely adhere on the surface of perforable platelets and does not prevent the subsequent perforation processes. Instead, the curable sealant material will completely adhere on the microporous substrate and occlude the apertures between the platelets. In this way, a fluid-tight membrane, in which the fluid to be filtrated will only pass through the pores that will be perforated on each platelet, is fabricated.

The 2D platelets can range in diameter from 10 nm to 1000 μm and in thickness from about 0.1 nm to about 1 μm.

The cured sealer materials may have a size or diameter in a range from about 1 nm to about 100 μm.

Transferring the platelets onto the surface of the porous substrate may be carried out using many techniques, including, but not limited to, vacuum deposition, chemical deposition, transfer printing, roll-to-roll printing, spin coating, spray coating, dip coating and painting to mention a few. Similarly, the curable sealing material may be deposited using the above-mentioned techniques.

During deposition of the curable sealing material various techniques may be used to control the locations of where the cured particles are located. Such techniques include, but are not limited to, using a mask to cover areas it is not desired to coat while leaving exposed areas to be coated. The uncured liquid sealing material may also be printed onto selected locations on the surface using various techniques.

Example

The present method will be illustrated using the following non-limiting example in which the porous substrate is platelets are graphene platelets, the porous substrates were microporous Teflon™ substrates, the curable sealing material was colloidal silica ($SiO_2$), and the process for producing the nanopores in the sealed layer was chemical etching achieved by depositing a sub monolayer of copper (Cu) on the top of the sealed layer and then employing Cu-assisted chemical etching at the Cu sites thereby producing the nanopores. Thus, in this embodiment the present disclosure provides a new method and system for producing graphene-based water purification membranes that combine the advantages of porous, single-layer graphene filters, energy-efficient filtration at relatively low differential pressures, with the benefits of graphene oxide membranes-high performance in terms of adsorption and filtration of impurities. The present purification method and system is based on weakly oxidized, few-layer graphene flakes that can be produced in large amounts from graphite using surfactant-assisted exfoliation. The purification membranes disclosed herein are fabricated using a three-step method: (i) non-porous graphene flakes are deposited on top of a highly porous substrate with micron-size holes; (ii) spacing between the flakes and the remaining open holes on the substrate are completely occluded by sintered colloidal silica to prevent water bypassing the graphene flakes; and (iii) (sub)nanopores are drilled through weakly oxidized and silica-free inter-particle regions of graphene flakes, restoring high water permeability at low differential pressures, compared to nearly zero flow rate during step ii. The use of colloidal silica for both sealing material and masking for perforation enables the patterns of (sub)nanopores to be selected. Moreover, fully penetrating pores generated by the present etching process are decisively advantageous over interlayer spacing in GO membranes for increasing the water flow rate (see references 9, 16). The present design avoids the requirements of high differential pressure typical of GO membranes due to their long water flow path length (see reference 3).

With the use of the curable sealing material as a mask as well, the present chemical etching process can be altered by other perforation methods such as ion, electron, neutron bombardment and plasma etching. In the alternative methods, ions, electrons or neutrons are accelerated towards target and collide to damage it. A silica nanoparticle mask can sufficiently protect graphene flakes from any damage while silica-free inter-particle regions of the graphene flakes are physically drilled through by the ion, electron or neutron beams in the methods mentioned above.

Methods

Weakly oxidized FLG flakes or platelets were prepared from nano-crystalline graphite (Sigma Aldrich, CAS 7782-42-5) using two treatment steps that were previously described by Sharifi et al. (see reference 18). The first treatment was conducted with nitric and sulfuric acid ($HNO_3:H_2SO_4$ 1:3 volume ratio) to promote dilation of graphite into multilayer flakes. An acid mixture with 200 mg $L^{-1}$ of nano-crystalline graphite was treated for 24 hours using ultrasonication (Branson, DHA-1000 ultrasonicator). After sonication, the slurry was diluted to 10 times the original volume with distilled water, and filtrated onto a track-etched polycarbonate membrane (Millipore, HTTP 0903, pore diameter 0.4 μm). The membrane was then allowed to dry for 24 hours at room temperature and used in the oxidizing treatment that follows. The second treatment utilized piranha solution ($H_2O_2:H_2SO_4$ 1:4 volume ratio) to functionalize the graphite into hydrophilic flakes that can be dispersed in water.

Piranha solution with 30.4 mg $L^{-1}$ of graphite from the previous exfoliation step were mixed for 30 min. The resulting graphite Piranha solution was diluted 10 times by volume with distilled water and vacuum filtrated onto the same type of polycarbonate membranes as in the previous step, and again dried for 24 hours. In order to prepare suspensions of weakly oxidized few layer graphene in water, 60 mg $L^{-1}$ of weakly oxidized graphite flakes prepared as above, were dispersed into a 600 mg $L^{-1}$ water solution of RNAVI (Sigma Aldrich, CAS 63231-63-0) from torula utilis yeast. This RNA-based, surfactant-assisted exfoliation method of graphite has been extensively discussed in Sharifi et al. (see reference 18).

The suspension is ultra-sonicated for 4 hours at room temperature with RNA acting as a surfactant. The resulting suspension was stored at 2° C. for 24 hours in a beaker to allow a sediment to precipitate, which consists of non-exfoliated graphite. The top three quarters of the beaker was centrifuged at 6000 rpm for 1 hour (Fisher Scientific, Accuspin™ 400 centrifuge) and the supernatant was used for membrane preparation. To prepare the water purification devices, 40 mL of supernatant was deposited by vacuum filtration onto porous (5 μm average pore size) 25 mm Teflon™ support discs (Chromatographic Specialties Inc., 006FR2505).

Membranes were then annealed at 250° C. for 10 min in air to dry and for 2 hours in nitrogen atmosphere, a treatment that in conjunction with the following strong acid process used to open the pores, is known to almost completely eliminate RNA from our FLG graphene thin films. 18 Variable amounts of colloidal silica (Syton® HT-50, CAS 7631-86-9) were then filtrated through on Teflon™ substrates. Amounts of silica colloid ranging from 1.8 L $m^{-2}$ and 5.4 L $m^{-2}$ with 0.6 L $m^{-2}$ steps were used to obtain a set of filtration membranes with different properties. The colloidal silica treatment was followed by a second annealing step in a glove box (Nexus II, Vacuum Atmosphere Inc.) at 250° C. for 2 hours under a nitrogen atmosphere with less than 10 ppm of oxygen and moisture.

Thermal evaporation of copper was performed on our membranes in an ultra-high vacuum chamber (base pressure 10-6 Pa) using Cu pellets (99.99% purity, K.J. Lesker Inc.). The vacuum chamber is connected to the glove box to prevent oxidation during sample loading. Pellets were positioned in alumina crucibles (K.J. Lesker cat. no. EVA9AO) that were supported by tungsten basket heaters (K.J. Lesker Inc., cat. no. EVB8B3030W). Heat was delivered to this assembly at 7.5 V and 65 A by means of a Hewlett Packard 6466C DC power supply and the thickness of the growing film was measured using a calibrated quartz crystal oscillator connected to a Sycom STM-2 thickness monitor. A nominal thickness of 1.0±0.3 nm Cu was deposited at a chamber pressure of $2.5\times10^{-6}$ mbar at a rate of 0.5 Å $s^{-1}$, with the sample stage temperature maintained below ~60° C. Immediately following copper deposition, metal-assisted etching was performed in a 70% nitric acid bath (70%, Caledon, CAS 7697-37-2) for 10 min, followed by cleaning in a distilled water bath 3 consecutive times for 10 min each time.

SEM imaging was performed during all of the fabrication steps as discussed below. SEM and EDX measurements were performed using a Zeiss LEO 1540XB system. The surface conductivity of all samples was increased by depositing ~1 nm of osmium prior to SEM and EDX measurements using a Filgen OPC80T Os plasma coater.

After Os coating, graphene-based membranes were mounted onto flat sample holders using double sided carbon tape. Silver paint (Pelco® Colloidal Silver Liquid) was applied on the edge of the sample to the sample holder to improve conductivity. Mounted samples were transferred to the vacuum chamber attached to the instrument and pumped down to a pressure lower than $1.0\times10^{-6}$ Torr. SEM morphology images were obtained by detecting secondary electrons at 1 kV with a magnification of 5 k and 10 k. EDX was collected at 10 kV with a magnification of 1 k and 5 k. The flow rate through our graphene-based membranes was characterized using a 25 mm vacuum filtration apparatus (Wheaton, cat. no. 419327). The apparatus consisted of a 15 mL tunnel pressed to a 25 mm glass support base and held together with an anodized aluminium clamp, with the membrane mounted between the funnel and support base.

The glass support base was fed through a no. 5 silicone stopper that was placed in the top opening of a 250 mL flask with a #2 side hose connection that was connected to a variable pressure vacuum source. The graphene-based membranes were mounted between the funnel and glass support base in a unique Teflon™ holder that was machined in house to fit both the glass support base and the 25 mm Teflon™ substrates tightly. Additionally a Teflon™ gasket (Chromatographic Specialties Inc., N419338) was added between the Teflon™ holder and Teflon™ substrate on the bottom of the graphene-based membrane to prevent water from leaking around the membrane instead of passing through it. With a membrane mounted in the filtration apparatus, flow rate tests were conducted by drawing 25 mL of distilled water through the membranes at a differential pressure in the 10 to 90 kPa range.

The pressure was measured using an inline vacuum gauge (Innova Equus 3620). EPR measurements were performed using a Jeol FA-200 EPR spectrometer operating in the X-band at 9.1 MHz at room temperature. 10 mg $L^{-1}$ solutions of $MnCl_2$ (Sigma Aldrich, 99%, CAS 7773-01-5) and $FeCl_3$ (Sigma Aldrich, 97%, CAS 7705-08-0) were prepared by dissolving powder samples in distilled water and mixing for 20 minutes by ultra-sonication. Metal ion solutions were measured in liquid form by inserting a fixed amount into a glass capillary tube with 1.0 mm inner diameter (4 µL for $MnCl_2$ and 15 µL for $FeCl_3$) using a micro pipette. The filled capillary was then placed in a quartz glass EPR tube of 5 mm inner diameter (Wilmad LabGlass, 710SQ-250M) and inserted in the microwave cavity. EPR measurements were performed by first tuning the microwave cavity using a sample of unfiltered metal ion solution as a reference, and keeping the tuning parameters fixed for all further measurements of filtered metal ion solutions.

Electron paramagnetic resonance (EPR) is used herein as a highly selective analytical technique to probe low metal ion concentrations in water, before and after purification through graphene-based membranes. EPR is capable of detecting paramagnetic centres in very low amounts, on the order of parts-per-billion. As a trace detection technique, EPR has significant advantages in terms of selectivity and sensitivity over common detection methods, including ion conductivity measurements, (see reference 4). The EPR spectrum of each metal ion has specific fingerprints, and each paramagnetic impurity can be independently monitored. Using EPR, we are able to show that our graphene-based membranes retain metal ions through two cooperating mechanisms: size-based rejection and sorption on the graphene surfaces or at the pore edges.

The parameters used for EPR measurements of $Mn^{2+}$ were: 8 min sweep time scanning from 275 to 375 mT, receiver gain of 200, 100 kHz modulation frequency, 1.0 mT modulation width, 1.0 s time constant, 2 mW microwave power, and microwave phase and coupling set to 339 and 441, respectively. For $Fe^{3+}$ the sweep time was 8 min scanning from 285 to 365 mT with a receiver gain of 10000, a modulation frequency of 100 kHz with a modulation width of 1.4 mT, 3.0 s time constant, 5 mW microwave power, and microwave phase and coupling set to 709 and 441, respectively. The concentration of metal ions was determined by integrating the EPR signal over the external magnetic field and calculating the integral area. The error in EPR measurements was quantitatively determined as the difference between the integrated signal areas of subsequent, identical measurements of the same sample.

Membrane Fabrication

The entire fabrication process of our water purification devices is depicted in FIGS. 1(a) to 1(e). Purification membranes produced in accordance with present disclosure incorporate weakly-oxidized flakes of few-layer graphene (FLG), as opposed of highly oxidized GO flakes, (see reference 17), with the flakes made nanoporous in post-deposition treatments. FLG flakes were prepared using surfactant-assisted exfoliation of graphite in water, a method originally developed by Sharifi et al. (see reference 18). This method utilizes specific types of ribonucleic acid (RNA) as efficient surfactants for graphite exfoliation, as shown in FIG. 1(a). RNA of this type can be cultured in large amounts at low costs, comparable to the costs of graphite starting material. Thus, the cost of RNA has very limited impact on the overall fabrication costs, and the method is scalable for producing large amounts of water-based, few-layer graphene suspensions (see reference 18).

Substrates for the present graphene thin film deposition are microporous Teflon™ disks through which aqueous suspensions of FLG are vacuum-filtrated as shown in FIG. 1(a), to produce the structure shown in FIG. 1(b). Micropores in the Teflon™ disks have diameters (~5 µm) that are smaller than the size of FLG flakes (~10 to 30 µm). Thus, filtration of suitable amounts of suspension resulted in an almost complete coverage of the substrate micropores, which was signalled by a strong (>90%) decrease of filtration rate. About 24 L $m^{-2}$ of FLG suspension was necessary for high substrate coverage by graphene flakes. However, even at such high coverage, water might leak through the membrane via the spacing between partially overlapped graphene flakes juxtaposed to the substrate micropores. Such leaks need to be completely eliminated to make graphene thin films water-tight such that water passes through nanopores to be drilled in graphene flakes during subsequent fabrication steps, and not through the larger inter-flake spacing between partially overlapping graphene domains.

Scanning electron micrographs (SEM) of Teflon™ substrates before and after coverage with not-yet nanoporous FLG flakes are shown in FIGS. 2(a) and 2(b), respectively. Comparison between the two FIGS. 2(a) and 2(b) shows that substrate coverage by graphene is almost complete, with partially overlapped FLG flakes that are larger than the Teflon™ micropores, but with some spaces still remaining between the flakes as shown schematically in FIG. 1(b). In order to make our graphene layer water-tight, colloidal silica was vacuum-filtrated through the membrane to fill any spaces between FLG flakes and occupy any micropores that remained open in the Teflon™ support after graphene deposition. Samples were subsequently annealed at 250° C. to promote sintering of silica colloid, resulting in the morphology seen in FIG. 2(c).

Comparison of FIGS. 2(b) and 2(c) of demonstrates that not only has silica cemented the interstitial spacing between partially overlapping graphene flakes, but also led to partial coverage of graphene by $SiO_2$ nanoparticles (np-$SiO_2$) that have thermally nucleated during annealing. As detailed in the inset of FIG. 2(c), a uniform distribution of np-$SiO_2$ of less than 50 nm in diameter is formed on top of our graphene flakes due to their hydrophobicity (see reference 19). Inter-particle spacing is often less than 10 nm, which indicates extensive graphene coverage by np-$SiO_2$. As indicated in FIGS. 1(c) and 1(d), application of colloidal silica on top of our graphene thin films plays three critical roles in the fabrication of our devices. First, the sintered silica occludes the residual micropores that remained open on the Teflon™ substrate after graphene deposition. Secondly, the silica seals the interflake spacing between partially overlapping graphene domains. When combined, these two functions prevent any leaks around the edge of graphene flakes which are, in fact, water-tight. Thirdly, in addition, silica nanoparticles nucleated on graphene form a mask that can be used for location selective etching of the underlying graphene, with the formation of nanopores only on flake regions that are not coated by silica. This means the density of resultant (sub)nanopores can be controlled by using different size and different amounts of np-$SiO_2$, which changes np-SiO2-free areas on graphene where (sub)nanopores which are fabricated in the later process.

In order to make the graphene flakes nanoporous and to restore high water permeability through the present membranes, metal-assisted etching by nitric acid was used, a technique that was originally proposed by Ramasse et al. (reference 20) for graphene oxide and was here adapted for weakly oxidized graphene. Metal assisted etching is based on metal nanoparticles (e.g. copper) that oxidize in the proximity of graphene oxide due to the Brønsted-type properties of $HNO_3$ see reference 3).

It has been proposed that metal oxidation in the presence of GO promotes a certain degree of additional oxidation of carbon, breaking some C—C bonds in oxidized graphene with the formation of more C—O and C—OH groups (see references 15, 20). Pores locally form in correspondence to such terminations, where C—C bonds are broken. In our specific case, in which the preceding oxidation of the carbon backbone is localized and weak, pores are anticipated to have very small (at the nanometre or even sub-nanometre scale) diameter. Therefore, they may be suitable to filtrate metal ion impurities in water via size-based rejection.

FIG. 2(d) shows the SEM image of one of the membranes after thermal evaporation of nominally 1 nm thick copper layer on top. From this image, it can be observed that Cu deposits both on top of np-$SiO_2$ and silica-free inter-particle regions in which metal atoms are in direct contact with graphene. This so conformation of Cu deposition is demonstrated in FIG. 1(d), in which Cu is in direct contact with FLG flakes, it assists $HNO_3$ in etching locally oxidized areas on the graphene backbone, resulting in the formation of small pores over short periods of time. As can be observed in FIGS. 3(b) to 3(d) there are a lot more pores in FIG. 3(b) compared to FIG. 3(d) so that these pores are too small to be resolved with SEM, indicating their size should be in nanometer range or below. Nanopore size in the present metal-assisted etching process is determined by size of the pristine oxidized centers in our FLG flakes, which is less than the inter-particle distances between np-$SiO_2$, not by the size of Cu patterns in contact with graphene.

The presence of (sub)nanometer pores in our FLG flakes, and the specific conditions in which they form, could be inferred using energy-dispersive X-ray spectroscopy (EDX). EDX images are shown in FIGS. 3(a) to 3(d) in conjunction with SEM scans of two distinct membranes. These membranes were treated with small (FIGS. 3(a) and 3(b)) and large (FIGS. 3(c) and 3(d)) amounts of silica colloid, followed by annealing and etching in $HNO_3$ under identical conditions. When a relatively small amount of silica colloid was used as in FIG. 3(a), the graphene flake surface was only partially covered with np-$SiO_2$. Under these treatment conditions, a strong increase in the fluorine EDX signal originating from the underlying Teflon™ substrate could be observed (FIG. 3(b)) after Cu-assisted membrane etching in $HNO_3$. The subsequent increase in fluorine-to-carbon ratio is clear evidence of decreased areal C atom concentration in graphene flakes after etching, and shows their higher porosity. Conversely, when a larger amount of silica colloid was used to seal the membranes as in FIG. 3(c), the graphene flake surface was almost completely covered by np-$SiO_2$.

Although EDX mapping showed that the elemental composition of this membrane prior to Cu-assisted $HNO_3$ etching was not dissimilar from that shown in FIG. 3(a), EDX in panel d shows no significant increase in the fluorine-to-carbon ratio after membrane etching. This suggests that no nanopores were formed in membranes treated with excess silica colloid, and points to an optimal amount of colloid required to seal the membranes and simultaneously form a sparse template for pore etching. Unless otherwise stated, the characterization of filtration performance that follows refers to devices treated with optimal amount of silica colloid (3 L per $m^2$ of membrane area).

Testing Flow Rate and Differential Pressure

The flow rate of graphene-based membranes before and after nanopore formation was tested as a function of the volume of silica used to seal the spacing between flakes in the graphene thin films and form a template for nanopore fabrication. During tests in a dead-end filtration configuration, our optimized membrane demonstrated a flow rate of ~20 L $m^{-2}$ $min^{-1}$, comparable to most graphene oxide and commercial counterparts, (see references 1 to 7) but operating at a differential pressure of $\Delta p$=83 kPa which is significantly lower than differential pressures (700-1500 kPa) (see reference 5) normally used in state-of the art RO purification systems. This represents a significant breakthrough over existing technologies in terms of their energy footprint because the energy required for water purification is proportional to $\Delta p$.

FIG. 4(a) shows the water flow rate before nanopore fabrication by metal-assisted $HNO_3$ etching. Prior to making the graphene flakes nanoporous, the flow rate was approximately constant (~10 L $m^{-2}$ $min^{-1}$) when colloidal silica treatment of the membranes was performed with less than 3 L $m^{-2}$. Between 3.6 L $m^{-2}$ and 5.4 L $m^{-2}$ of colloidal silica the flow rate monotonically decreases with increasing volume of silica colloid, trending to zero at the largest volumes at which the membranes are completely water-tight. The monotonically decreasing trend of water flow rate can be understood by considering that at low amounts of colloidal silica our devices were imperfectly sealed, which makes it impossible to ensure water passage through nanopores even though they have been drilled in the graphene. Water continues to flow in large proportions through inter-flake spacing that are much larger and more frequent than nanopores in graphene flakes, leading to less than optimal retention of impurities from water. Sealing of the inter-flake spacing becomes increasingly more efficient at increasing amounts of colloidal silica used in the membrane treatment.

FIG. 4(a) also shows the flow rates after metal-assisted $HNO_3$ etching of the devices. In this case corresponding to completed filtration membranes, the water flow rate is no longer a monotonic function of the amount of colloid used in the sealing treatment. The water flow increases at low amounts of colloidal silica and undergoes a maximum at about 3 L $m^{-2}$, at which the water flow rate doubles with respect to the same membrane prior to pore nanofabrication. For amounts of silica colloid greater than 3 L $m^{-2}$, metal-assisted $HNO_3$ etching of the membranes does not lead to any significant gains in the filtration rate. These three regimes can be explained as follows: at low amounts of silica colloid, below 3 L $m^{-2}$, nanopores in graphene were fabricated by metal-assisted $HNO_3$ etching, but the flow rate was not increased as dramatically because of the significantly larger openings still present in the form of inter-flake spacing that were imperfectly sealed by colloidal silica: water mostly passes through these spacing.

Conversely, at high amounts of silica colloid, above 3 L $m^{-2}$, few or no nanopores can be etched in graphene because the flakes are almost completely coated by np-$SiO_2$. Consequently, copper does not adhere to the graphene surface in this case, which leads to insufficient pore fabrication. The case of treatment with 3 L $m^{-2}$ of silica colloid is found to be ideal to both seal most of the inter-flake spacing, as well as form a nanostructured silica mask on the surface to guide metal-assisted $HNO_3$ etching of pores.

Figure 4B:
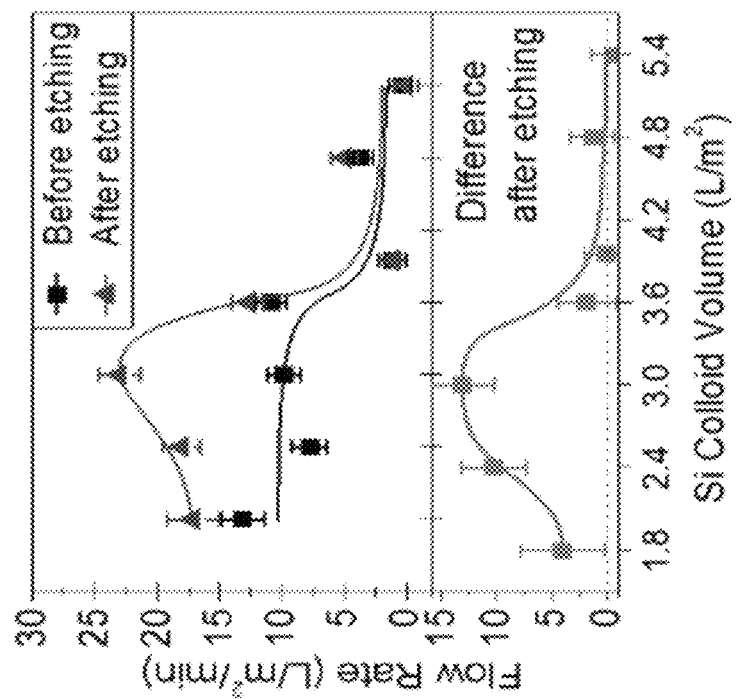
FIG. 4(b) shows flow rate vs. di☐erential pumping pressure for two completed membranes with di☐erent colloid volume compared to a bare Teflon™ support. The membranes are shown to have a measurable flow rate at operating di☐erential pressures as low as 34 kPa.

The performance curve of the present optimized membranes, expressing the water flow rate as a function of applied differential pressure, is shown in FIG. 4(b). Significant water flow occurs at differential pressures as low as 30 to 40 kPa in completed membranes, which corroborates their very low energy footprint. Bare Teflon™ substrates show a much higher flow rate at any differential pressure and therefore do not limit the flow rate through the graphene membrane in which most of the water purification occurs. FIG. 4(a) also shows that water flow through ultrathin graphene layers is negligibly small prior to pore opening (upper panel), but allows for a flow rate of 23 L m$^{-2}$ min$^{-1}$ at 83 kPa after pore fabrication which is comparable to ultrathin graphene oxide membranes, but at a lower operating differential pressure (see reference 3). It is known that metal-assisted $HNO_3$ etching can produce bored nano- or subnano-pores up to at least twenty (20) graphene layers (see reference 20). This fact combined with the large increase in fluorine EDX signal after etching observed in FIG. 3 suggests that large amounts of very small but fully penetrating pores have been drilled. We thus speculate that operation at very low differential pressure is made possible by path lengths shorter than those in GO membranes, through nanopores that penetrate the entire thickness of FLG, such that water flow is not restricted to interlayer spacing as in the case of GO laminates (see references 6, 16).

Water Purification from $Mn^{2+}$ and $Fe^{3+}$ Ions

In studies of water purification from $Mn^{2+}$ and $Fe^{3+}$ ions disclosed herein, EPR has been used to directly probe the concentration of paramagnetic metal ions in water prior to and after purification with membranes. The intensity of the EPR signal is proportional to the first derivative of microwave absorption by the paramagnetic metal ion system under examination, due to optical transitions between unpaired spin states parallel and antiparallel with respect to an external dc magnetic field (see reference 21). Therefore the EPR spectrum integrated over the external dc magnetic field is proportional to the number of paramagnetic metal ions in our water samples both before and after filtration. $Fe^{3+}$ and $Mn^{2+}$ ions are paramagnetic, stable in water, and produce detectable EPR signals at room temperature (see reference 22). Both ion types exhibit EPR spectra with a six-fold peak structure, resulting from overall electron configurations with electron spin $S=5/2$. Although $Fe^{2+}$ may also be present in water in limited amounts, it forms a quadruplet spin complex ($S=2$) that is only weakly paramagnetic, and therefore is not detectable by EPR at room temperature. $Fe^{3+}$ and $Mn^{2+}$ in part-per-million concentrations were used to test the effectiveness of the present purification process, and the difference in EPR intensity before and after purification is a good measure of our membrane effectiveness to independently retain these two ion types.

$Fe^{3+}$ and $Mn^{2+}$ ions in solution were obtained from $MnCl_2$ and $FeCl_3$ dissolved in water. Both feed solutions were passed through our devices up to five times to investigate the effectiveness of multiple purification steps on the same solution. Multiple-pass filtration was also useful to gain insight into the nature of the dominant ion retention mechanisms of our graphene-based membranes. The mechanisms can be either (i) pore diameter-based rejection, due to sub-nanopores comparable in size to the size of metal ions and their hydration shells, or (ii) ion adsorption, due to capture at nanopore edges. Although fluorine EDX maps in FIGS. 3(a) to 3(d) show clear evidence of nanoporosity in the graphene flakes, with pore size below the detection limit of SEM (i.e. <5 nm), no direct estimate of the pore diameter could be obtained. Thus, an indirect estimate by analysis of the filtration process is imperative in our case. A decrease in ion concentration after a single pass is more likely due to filtration by pore diameter-based rejection, while increasing ion removal in subsequent passes is more likely attributable to adsorption at nanopore edges.

FIGS. 5(a) and 5(b) show the EPR spectra of 10 mg L$^{-1}$ aqueous feed solutions of $Mn^{2+}$ and $Fe^{3+}$, respectively. The panels compare the spectra measured before purification with our optimized graphene-based membranes and after five consecutive passes. For both types of ions, FIGS. 5(c) and 5(d) show that the performance of our porous graphene membranes are superior to bare Teflon™ supports. Furthermore, for both $Mn^{2+}$ and $Fe^{3+}$ ions, some degree of retention is observed even after a single pass through the membrane, with 25±4% of $Mn^{2+}$ and 20±6% of $Fe^{3+}$ of ions trapped. Multiple filtration passes show that additional fractions of $Fe^{3+}$ ions could be trapped, and their concentration in water can be reduced to 45±6% of the pristine value.

Compared to the retention of increasing amounts of $Fe^{3+}$ ions with increasing number of passes, water purification from $Mn^{2+}$ ions using our membranes (FIG. 5(c)) shows a trend of slightly increased concentration after the first pass. This may be explained by considering two distinct mechanisms of absorption and pore-based rejection that remove ions from solution. Metal ions may be either absorbed through ionic bonding or trapped sterically within membrane pores, as disclosed in reference 5. Considering these mechanisms and the trend in FIG. 5(c), the membrane is saturated to $Mn^{2+}$ absorption after one filtration pass, including a fraction of ions trapped in the membrane and Teflon™ support. The fraction of ions weakly trapped may then be circulated into the permeate solution during additional filtration passes. From this result it can be inferred that water purification from $Mn^{2+}$ ions occurs via a combination of pore diameter-based rejection and absorption. In contrast, the concentration $Fe^{3+}$ ions decreases non-reversibly with multiple filtration passes through a graphene-based membrane, indicating $Fe^{3+}$ ions are retained more readily by ion adsorption at nanopore edges.

Figure 6B:
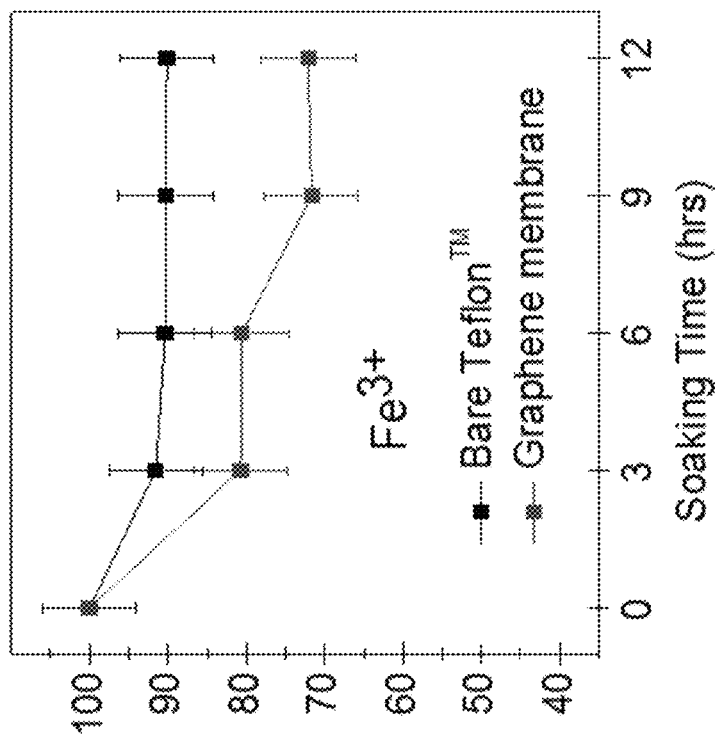
FIGS. 6(a) and 6(b) show relative ion concentration of $Mn^{2+}$ and $Fe^{3+}$ respectively after soaking of the both bare Teflon™ support and an optimized graphene-based membrane. Both ion types are partially retained in the membranes after 3 h of soaking, with no further observed uptake of ions within experimental error over a 12 hour (h) period.
Figure 6A:
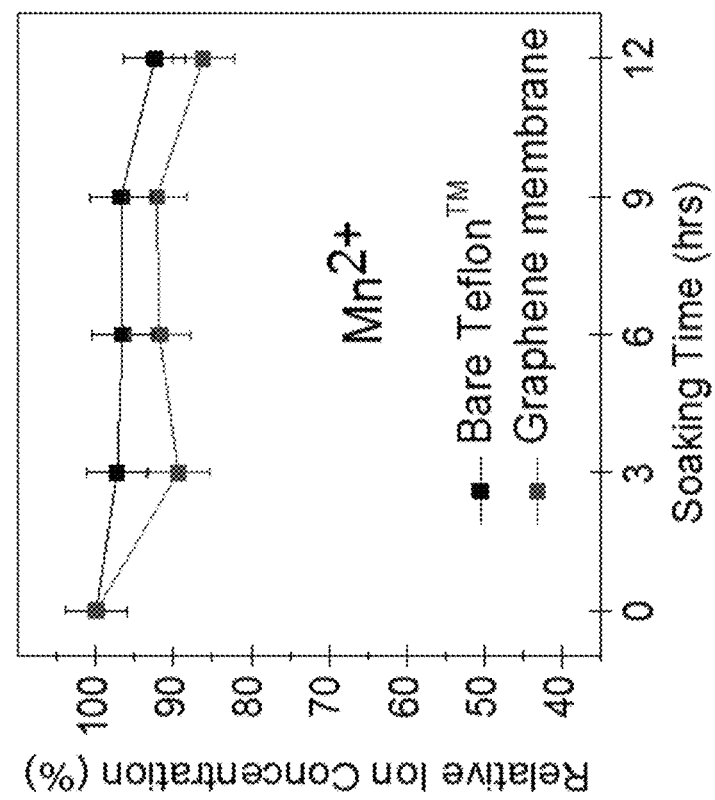

In order to further discriminate from the two proposed mechanisms of pore-based rejection and absorption of metal ions, our graphene-based membranes have been immersed for up to 12 h in 10 mg L$^{-1}$ in aqueous solutions of $Mn^{2+}$ and $Fe^{3+}$. Clearly, no pore-size based ion retention can occur during the immersion process, while ion adsorption at the membrane surface, or at the pore edge, may still take place. The changes of metal ion concentrations in the water bath over time are shown in FIGS. 6(a) and 6(b) for $Mn^{2+}$ and $Fe^{3+}$ ions, respectively. The concentration of $Mn^{2+}$ ions reaches an asymptote at 90±4% of the pristine fraction after the first three (3) h of immersion. This indicates relatively low adsorption of $Mn^{2+}$ ions. Conversely, the concentration of $Fe^{3+}$ ions continues to decrease until 70±4% at 9 hour (h). This indicates that absorption of $Fe^{3+}$ ions at the membrane surface is more prevalent than absorption of $Mn^{2+}$ ions. Consequently, data shown in FIGS. 6(a) and 6(b) shows that a greater fraction of $Fe^{3+}$ can be absorbed compared to $Mn^{2+}$. This result supports the finding from FIG. 5(c) that recirculation of $Mn^{2+}$ between the graphene-based membrane and ion solution occurs due to $Mn^{2+}$ ions retention through pore diameter-based rejection, with weak adhesion of these ions at the surface. In contrast, $Fe^{3+}$ ions do not show evidence of recirculation (FIG. 6(b)), and remain more steadily absorbed in the membrane over time.

The different mechanisms of water purification from these two types of metal ions can be understood by considering that $Mn^{2+}$ has an approximately 10% larger hydration shell as a consequence of greater screening by water molecules and a larger ionic radius. This explains why $Mn^{2+}$ concentration is more easily decreased than $Fe^{3+}$ by pore diameter-based rejection after only one filtration. By contrast $Fe^{3+}$ may be more easily captured by electrostatic adsorption due to reduced screening between the metal ion at centre of the hydration shell and oxygen functional groups in pore edges of weakly oxidized FLG. The EPR results agree with this hypothesis in which multiple filtrations can remove more $Fe^{3+}$ compared to $Mn^{2+}$, retaining up to 55±6% of the $Fe^{3+}$ ion concentration in the membranes. Considering these two mechanisms of purification, EPR results suggest that the typical sub-nanopore diameter in our graphene-based membranes is in between the hydration shell diameters of $Fe^{3+}$ (0.40 nm) and $Mn^{2+}$ (0.44 nm) (see reference 23).

CONCLUSIONS

In conclusion, an exemplary non limiting example of a molecular sieve has been produced and characterized herein. More particularly, graphene-based water purification membranes have been assembled on Teflon™ substrates with large porosity using a fabrication process that is highly scalable and low in both complexity and cost. These membranes have been assembled using nanoporous few-layer graphene platelets that combine the advantages of porous single-layer graphene, offering energy efficient water filtration at relatively low differential pressures, and highly oxidized graphene oxide, which offers high performance in terms of adsorption and impurity filtration. A step in the fabrication process utilized colloidal silica to seal the spacing between partially overlapped graphene flakes to produce the water-tight membranes prior to drilling pores in few-layer graphene. In this way, purification occurs by water passing through the nanopores which were fabricated by Cu-assisted etching in nitric acid. This unique design was used to demonstrate water purification from metal ions through a combination of sub-nanopore filtration in the case of $Mn^{2+}$ ions, or adsorption at pore edges in the case of $Fe^{3+}$ ions that possess a hydration shell diameter smaller than $Mn^{2+}$ ions.

A significant competitive advantage of our graphene-based membranes that makes them uniquely positioned to solve the problem of high energy costs associated with water filtration by RO is the low differential operating pressure, in the range of 80-90 kPa, at which high flow rates (~20 L m$^{-2}$ min$^{-1}$) can be obtained. This is significantly lower than the pressures (700-1500 kPa) used in state-of-the-art commercial filtration systems based on reverse osmosis, and corresponds to a large reduction in the energy footprint for filter operation. By careful control over the pore drilling conditions allows pores of a fixed size and even distribution to be fabricated reproducibly. In this regime, filters exhibiting pore filtration can be used to remove any ionic contaminant from aqueous solution, with an efficacy that depends on the size of the hydration shell for both size based rejection and adsorption. With these properties our porous graphene-based membranes could have applications in removing contaminants from water at a much lower cost compared to conventional methods such as reverse osmosis membrane filtration.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

REFERENCES

1. S. L. Loo, A. G. Fane, W. B. Krantz and T. T. Lim, *Water Res.*, 2012, 46, 3125.
2. H. Li, L. Zoua, L. Pan and Z. Sun, *Sep. Purif. Technol.*, 2010, 75, 8.
3. H. M. Hegab and L. Zou, *J. Membr. Sci.*, 2015, 484, 95.
4. R. K. Joshi, P. Carbone, F. C. Wang, V. G. Kravets, Y. Su, I. V. Grigorieva, H. A. Wu, A. K. Geim and R. R. Nair, *Science*, 2014, 343, 752.
5. A. Aghigh, V. Alizadeh, H. Y. Wong, M. S. Islam, N. Amin and M. Zaman, *Desalination*, 2015, 365, 389.
6. S. C. O'Hern, M. S. H. Boutilier, J. C. Idrobo, Y. Song, J. Kong, T. Laoui, M. Atieh and R. Karnik, *ACS Nano*, 2013, 7, 428.
7. G. Z. Kyzas, E. A. Deliyanni and K. A. Matis, *J. Chem. Technol.* Biotechnol., 2014, 89, 196.
8. H. Wang, X. Yuan, Y. Wu, H. Huang, X. Peng, G. Zeng, H. Zhong, J. Liang and M. Ren, *Adv. Colloid Interface Sci.*, 2013, 195-196, 19-40.
9. N. Wei, X. Peng and Z. Xu, *ACS Appl. Mater. Interfaces*, 2014, 6, 5877.
10. S. C. O'Hern, M. S. H. Boutilier, J. C. Idrobo, Y. Song, J. Kong, T. Laoui, M. Atieh and R. Karnik, *Nano Lett.*, 2014, 14, 1234.
11. S. P. Koenig, L. Wang, J. Pellegrino and J. S. Bunch, *Nat. Nanotechnol.*, 2012, 7, 728.
12. S. P. Surwade, S. N. Smirnov, I. V. Vlassiouk, R. R. Unocic, G. M. Veith, S. Dai and S. M. Mahurin, *Nat. Nanotechnol.*, 2015, 10, 459.
13. K. He, A. W. Robertson, C. Gong, C. S. Allen, Q. Xu, H. Zandbergen, J. C. Grossman, A. I. Kirklanda and J. H. Warner, *Nanoscale*, 2015, 7, 11602.
14. D. Zhou, Y. Cui, P.-W. Xiao, M.-Y. Jiang and B.-H. Han, Nat. Commun., 2014, 2, 1.
15. H. Cao, X. Zhou, C. Zheng and Z. Liu, *Carbon*, 2015, 89, 41.
16. R. K. Joshi, S. Alwarappan, M. Yoshimura, V. Sahajwalla and Y. Nishina, *Appl. Mater. Today*, 2015, 1, 1.
17. G. Eda, G. Fanchini and M. Chhowalla, *Nat. Nanotechnol.*, 2008, 3, 270.
18. F. Sharifi, R. Bauld, M. S. Ahmed and G. Fanchini, *Small*, 2012, 8, 699.
19. X. Zhang, S. Wan, J. Pu, L. Wang and X. Liu, *J. Mater. Chem.*, 2011, 21, 12251.
20. Q. M. Ramasse, R. Zan, U. Bangert, D. W. Boukhvalov, Y.-W. Son and K. S. Novoselov, *ACS Nano*, 2012, 6, 4063.
21. C. P. Poole, Electron Spin Resonance: *A Comprehensive Treatise on Experimental Techniques*, Dover Publications, Inc., Mineola, N.Y., USA, 1996.
22. S. K. Misra, S. Diehl, D. Tipikin and J. H. Freed, *J. Magn. Reson.*, 2010, 205, 14.
23. I. Persson, *Pure Appl. Chem.*, 2010, 82, 1901.

Therefore what is claimed is:
1. A method for producing a water permeable molecular sieve, comprising:
   a) providing a porous substrate having micron-size pores;
   b) depositing non-porous 2D platelets onto a surface of the porous substrate to seal, at the surface, pores in the porous substrate to form a layer of 2D platelets;
   c) depositing a curable sealing material onto the layer of 2D platelets and any remaining exposed areas of the surface of the porous substrate and curing the curable sealing material in order to form a sealed layer on the surface of the porous substrate to prevent water bypassing the non-porous 2D platelets and passing through the porous substrate; and d) producing an array of sub-nanopores through the sealed layer with the array of sub-nanopores having a size to allow water to pass therethrough but not metal ions to give a water permeable molecular sieve characterized by water permeability at low differential pressures.

2. The method according to claim 1, wherein the porous substrate having micron-size pores comprises any one of microporous Teflon™, polytetrafluoroethylene, polycarbonate, nitrocellulose, anodized alumina, fritted glass, plastic grids and metallic grids.

3. The method according to claim 1, wherein the non-porous 2D platelets comprises any one of graphene platelets, graphene oxide platelets, doped graphene platelets, functionalized graphene platelets, boron nitride (BN) platelets, molybdenum sulphide ($MoS_2$) platelets, molybdenum selenide ($MoSe_2$) platelets, carbon platelets, carbon fibres, micro graphite platelets, nanocrystalline graphite platelets, nickel oxide platelets, nickel oxide tubules, silicon whiskers, and silicon platelets.

4. The method according to claim 1, wherein the curable sealing material comprises any one or combination of sol-gel processed materials, epoxy resins, vinyl glues (vinyl polymers), polyurethane, curable polymers and ceramics.

5. The method according to claim 4, wherein the sol-gel processed materials comprise any one or combination of alkoxides, silicates, acrylates, siloxanes, ormosils, silica gels, and sulfides.

6. The method according to claim 4, wherein the epoxy resins comprise any compounds that can be produced by combining phenols, bisphenols or glycidylamines with crosslinking agents including, but not limited to epichlorohydrin, aminoplasts, phenoplasts and isocyanates.

7. The method according to claim 4, wherein the vinyl glues (vinyl polymers) comprise any one or combination of polyvinyl alcohols, polyvinyl acetates, polyvinyl chlorides, polyacrylonitriles and polyvinyl fluorides.

8. The method according to claim 4, wherein the curable polymers comprise any one or combination of polyethylene, polyesters, polypropylene, polycarbonates, poly-chitosan, polyurethanes, polyimides, and polyamides.

9. The method according to claim 4, wherein the ceramics comprise any one or combination of alumina, beryllia, barium titanate, bismuth strontium calcium copper oxide, boron oxide, boron nitride, ceria, ferrite, lead zirconate titanate, magnesium diboride, porcelain, silica, silicon aluminium oxynitride, silicon carbide, silicon nitride, strontium titanate, strontium aluminate, titania, titanium carbide, yttria, zinc oxide and zirconium dioxide.

10. The method according to claim 1, wherein the step d) of producing an array of sub-nanopores through the sealed layer comprises any one or combination of chemical etching of selected sites on the sealed layer, laser irradiation of selected sites on the sealed layer, ion bombardment of selected sites on the sealed layer, neutron bombardment of selected sites on the sealed layer, electron bombardment of selected sites on the sealed layer, plasma etching of selected sites on the sealed layer, and UV treatments of selected sites on the sealed layer.

11. The method according to claim 1, including a step of templating the curable sealing material onto the surface of the 2D platelets and any exposed regions of the surface of the microporous substrate in order to protect regions on the sealed surface through which the array of nanopores are not to be produced.

12. The method according to claim 11, wherein the step of templating includes controlling a size and location of the cured sealing material particles on the layer of 2D platelets and any remaining exposed areas of the surface of the porous substrate.

13. The method according to claim 11, wherein the step of templating includes selecting the microporous substrate, the 2D platelet material and the curable sealant material to have a preselected combination of hydrophobicity and hyrdophillicity to control the selectivity of pore occlusion and/or the coverage of curable sealant material on the 2D platelet surfaces and the microporous substrate.

14. The method according to claim 1, wherein the non-porous 2D platelets are graphene flakes or flakes of graphene based materials, and wherein the curable sealing material are $SiO_2$ nanoparticles, and wherein the microporous substrate is microporous Teflon™.

15. The method according to claim 2, wherein the curable sealing material comprises any one or combination of sol-gel processed materials, epoxy resins, vinyl glues (vinyl polymers), polyurethane, curable polymers and ceramics.

16. The method according to claim 3, wherein the curable sealing material comprises any one or combination of sol-gel processed materials, epoxy resins, vinyl glues (vinyl polymers), polyurethane, curable polymers and ceramics.

17. A product produced using the method according to claim 1.

18. A water permeable molecular sieve, produced by a method comprising:
   a) providing a porous substrate having micron-size pores;
   b) depositing non-porous 2D platelets onto a surface of the porous substrate to seal, at the surface, pores in the porous substrate to form a layer of 2D platelets;
   c) depositing a curable sealing material onto the layer of 2D platelets and any remaining exposed areas of the surface of the porous substrate and curing the curable sealing material in order to form a sealed layer on the surface of the porous substrate to prevent water by-passing the non-porous 2D platelets and passing through the porous substrate; and
   d) producing an array of sub-nanopores through the sealed layer with the array of sub-nanopores having a size to allow water to pass therethrough but not metal ions to give a water permeable molecular sieve characterized by water permeability at low differential pressures.

19. The water permeable molecular sieve according to claim 18, wherein the porous substrate having micron-size pores comprises any one of microporous Teflon™, polytetrafluoroethylene, polycarbonate, nitrocellulose, anodized alumina, fritted glass, plastic grids and metallic grids.

20. The water permeable molecular sieve according to claim 18, wherein the non-porous 2D platelets comprises any one of graphene platelets, graphene oxide platelets, doped graphene platelets, functionalized graphene platelets, boron nitride (BN) platelets, molybdenum sulphide ($MoS_2$) platelets, molybdenum selenide ($MoSe_2$) platelets, carbon platelets, carbon fibres, micro graphite platelets, nanocrystalline graphite platelets, nickel oxide platelets, nickel oxide tubules, silicon whiskers, and silicon platelets.

* * * * *